Figure 1:
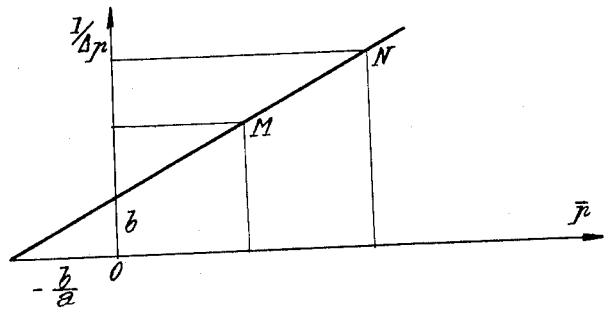

June 21, 1966        R. GREMION        3,256,732
METHODS AND DEVICES FOR DETERMINING THE MEAN RADIUS
OF PORES IN MICROPOROUS BARRIERS
Filed Nov. 13, 1962

INVENTOR.
ROBERT GREMION
BY
Bacon & Thomas
ATTORNEYS

United States Patent Office 3,256,732
Patented June 21, 1966

3,256,732
METHODS AND DEVICES FOR DETERMINING THE MEAN RADIUS OF PORES IN MICROPOROUS BARRIERS
Robert Gremion, Saint-Leu-la-Foret, France, assignor to Commissariat a l'Energie Atomique, Paris, France
Filed Nov. 13, 1962, Ser. No. 236,818
1 Claim. (Cl. 73—38)

This invention relates to methods and devices for determining the mean radius of pores in microporous barriers, such as those utilized in processes for the isotopic separation of uranium by gaseous diffusion of uranium hexafluoride.

The present invention is concerned more particularly, among these methods and devices, with those suitable for determining the value of the difference $\Delta p$ between the pressure $p_1$ and $p_2$ prevailing on either side of the barrier to be studied for two different known values of the half-sum $\bar{p}$ of these two pressures (also called "mean pressure"), and for determining therefrom the value of the quantity $$K = \frac{a}{b}$$

equal to the average radius of the pores which is to be found, wherein K is a constant depending on the conditions in which the experiment is conducted (nature of the gas passing through the barrier, and temperature), $a$ and $b$ designating two constants having the following relationship:

$$1/\Delta p = a\bar{p} + b$$

The invention consists essentially—in addition to the above-defined procedure in which advantage is taken of the variations of pressures $p_1$ and $p_2$ prevailing on either side of the barrier to be studied—in dividing a confined space into two separate compartments by means of said barrier and delivering through a sound nozzle a constant gas output into one of said compartments (termed hereinafter the upstream compartment) while maintaining the other compartment (or downstream compartment) closed.

It also comprises, apart from this main arrangement, various other dispositions to be used preferably simultaneously, which will be described more in detail presently.

Figure 2:
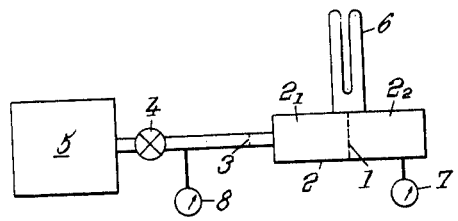
Figure 3:
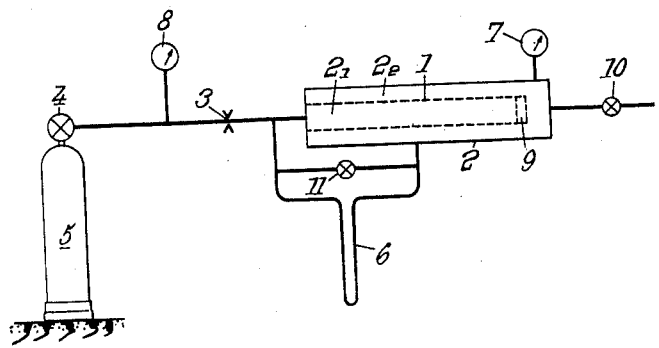

Reference will now be made to the accompanying drawing illustrating diagrammatically by way of example the basic principle of this invention and two specific forms of practical embodiments of devices operating according to this principle. In the drawing:

FIGURE 1 is a diagram for facilitating the understanding of the method of measuring the pore radius according to this invention, and FIGURES 2 and 3 illustrate diagrammatically two pore radius measuring devices constructed according to the method of the invention.

By definition, the permeability G of a microporous barrier with respect to a given gas is the output of this gas which flows through the barrier per surface unit when a unitary pressure difference occurs on either side of this barrier. Thus, assuming that $d$ is the gas output through the barrier, $\Delta p$ the difference between pressures $p_1$ and $p_2$ prevailing on either side of the barrier, and S the cross-sectional area of the barrier, the permeability is $$G = \frac{d}{\Delta p \cdot s} \quad (1)$$

Moreover, it is known that the permeability of a microporous barrier varies linearly as a function of the mean pressure $\bar{p}$ (i.e., the half-sum of pressures $p_1$ and $p_2$) according to a law of shape $$G = A\bar{p} + B \quad (2)$$

wherein A and B are coefficients subordinate to the radius of the pores:

$$A = K_1 r^4 \text{ and } B = K_2 r^3$$

whence $$r = K\frac{A}{B} \quad (3)$$

Coefficient K is a constant known for a given experiment, this constant depending in practice only on the nature of the gas flowing through the barrier and on the temperature.

These relationships have led to measurement of the mean radius of the pores in a barrier according to the following method:

A gas of known nature is fed at a well-defined temperature under open circuit conditions through the barrier to be studied.

When the rate of flow of the test gas becomes stabilized, the mean pressure $\bar{p}$ and difference $\Delta p$ are measured.

Then the test is repeated by feeding the same gas at a different pressure, waiting again until the gaseous flow rate is stabilized, and measuring again $\bar{p}$ and $\Delta p$.

The two values of $\bar{p}$ thus measured are plotted in abscissae and the corresponding values of $1/\Delta p$ are plotted in ordinates, thus providing two points M and N (FIG. 1).

Then the straight line interconnecting these two points is drawn, thus permitting the determination of the values of coefficients $a$ and $b$ defined by the straight line equation:

$$1/\Delta p = a\bar{p} + b \quad (4)$$

As the output $d$ is constant under stabilized rate conditions and surface area S is also constant during the experiment, it appears from Equation 1 hereinabove that the permeability G is proportional to $1/\Delta p$.

Therefore, coefficients A and B differ from coefficients $a$ and $b$ by a same coefficient of proportionality, and the ratios $A/B$ and $a/b$ are equal. Thus, Equation 3 may be written as follows:

$$r = K\frac{a}{b}$$

Since K, $a$ and $b$ are known, $r$ can be deducted therefrom.

In general, the above graphical representation and mathematical calculations are replaced by the simple reading of a graph.

This method is satisfactory but makes it necessary to apply successively two different gas pressures delivered through the barrier, and furthermore it is necessary to wait each time until the flow rate is stabilized; under these conditions, the measurement is a particularly time-consuming operation.

To avoid these drawbacks, according to the present invention the barrier 1 (FIG. 2) to be studied is so mounted as to divide a confined space 2 into two compartments $2_1$, $2_2$, the upstream compartment $2_1$ being fed with a constant-output gas through a sound nozzle 3, while the downstream compartment $2_2$ is kept closed.

Under these conditions, mathematical calculations will prove and experience will confirm that (1) the gas output $d$ through the barrier is constant, and (2) the mean pressure $\bar{p}$ is proportional to time.

It is therefore sufficient to measure the values of $\bar{p}$ and $\Delta p$ at two different times, which may be very close to each other, for obtaining the measurement of the mean radius $r$ contemplated.

This method is characterized, inter alia, by the following advantages over the known method: since the mean pressure varies by itself, it is no longer necessary to use artificially two different pressure values for the gas introduced into the confined space 2, and since on the other hand the output $d$ remains constant, it is also unnecessary to wait until the rate of flow becomes stabilized, and the measurement is thus effected much more rapidly.

In the form of embodiment of the invention illustrated diagrammatically in FIG. 2, the barrier 1 is flat and the gas is delivered through a pressure reducing device 4 from a bottle or like container 5 in which it is held under pressure, the difference between the pressures prevailing on either side of the diaphragm being measured with the assistance of a differential pressure gauge 6, the downstream pressure in the confined space 2 is measured by means of a pressure gauge 7, and the pressure of the gas fed through the nozzle 3 is measured by means of another pressure gauge 8.

In the embodiment illustrated diagrammatically in FIG. 3, the arrangement comprises a compressed-gas container 5, a pressure reducing device 4, a sound nozzle 3, and pressure gauges 6, 7 and 8. The confined space 2 is divided into two compartments $2_1$ and $2_2$ by the barrier 1, but the latter is of tubular instead of plane configuration and has one end connected in a fluid tight manner to the nozzle 3 and the opposite end thereof is closed by a plug 9. If desired, the plug 9 can consist of one portion of the wall of chamber 2.

By opening a normally closed valve 10, which is connected to the compartment $2_2$, it is possible to vent the downstream compartment $2_2$ to the atmosphere. The opening of a normally closed valve 11 permits by-passing the two arms or branches of the differential pressure gauge 6, across which arms said valve 11 is connected.

Now a detailed and more illustrative description of the invention will be given with reference to a specific measurement made with the device shown in FIG. 3, it being understood that this example should not be construed as limiting the invention.

The tubular microporous barrier 1 consists of a nickel wire gauze having its meshes interconnected through a microporous sheet of polytetrafluoroethylene. Its diameter is about 2 3/16" and its length about 20".

This barrier is mounted in the confined space 2 of elongated configuration having a total volume of about 46 cu. in.

The diameter of the nozzle 3 is about .006".

The differential pressure gauge 6 consists of a U-shaped tube filled with monoethyl ether of diethylene glycol, a substance having a low vapor tension at room temperature.

The pressure gauges 7 and 8 are metallic pressure gauges adapted to indicate pressure values ranging from 0 to 1.1 megapascals (160 p.s.i.).

The gas contained in bottle 5 is compressed air.

Initially, the valve 10 is opened and the pressure reducing device 4 is so adjusted that the pressure of the air flow delivered therefrom to nozzle 3, which pressure is read on the dial of pressure gauge 8, will equal 1.1 megapascals (160 p.s.i.).

Then the valve 10 is closed and the values of $\Delta p$ corresponding to two different values of $\bar{p}$ are measured, and the results thus obtained are used in the manner set forth hereinabove.

In the experiment described (which was carried out in actual practice) the resulting value of the mean radius of the pores was 3.6 hundredths of a micron, and it was observed that this result was perfectly reproducible and could be deducted from any two couples of measures (of $\Delta p$ and $\bar{p}$) selected from a greater number of these couples noted when the mean pressure $\bar{p}$ increased from 0.2 to 0.4 megapascals (29 to 58 p.s.i.).

It was also observed that said result was unaffected by modifications in the diameter of the nozzle 3 or in the volume of the confined space 2.

However, the variations of $\Delta p$ should remain relatively low in relation to those of $\bar{p}$.

Moreover, the ratio of the pressure prevailing downstream of the nozzle 3 to that obtaining upstream of this nozzle must constantly remain lower than a constant C having a theoretical value equal to .52 in the case of air, this constant being determined experimentally for each nozzle; this is the requirement to be met for maintaining the output through the nozzle to a constant value, for a constant upstream pressure.

In practice, if the measurements are obtained by reading pressure gauges, the time period elapsing between two selected measuring couples is preferably of the order of one minute. If the measures are recorded automatically, this time period may be reduced to about ten seconds. This illustrates the appreciable time gained with this invention by noting that the mite necessary for effecting measurements made according to the prior art methods requiring a double flow-rate stabilization was at least five minutes.

What is claimed is:

The method of determining the mean radius of pores in a microporus barrier, comprising the steps of delivering a gas under constant conditions through a sound nozzle into one of the compartments of a confined space divided into two compartments by said barrier, said gas being caused to flow through said barrier into the other of said compartments, and said other compartment being closed; measuring at two different but closely spaced instants in time the pressures $P_1$ and $P_2$ prevailing on either side of said barrier to determine two different values of the half-sum $\bar{p}$ of these pressures; and measuring at said two different instants the value of the difference $\Delta p$ between the pressures $P_1$ and $P_2$ prevailing on either side of said barrier, whereafter the value of the quantity $$K = \frac{a}{b}$$

which is equal to the mean radius of the pores which is to be found is deducted from said $\bar{p}$ and said $\Delta p$ values, K designating a constant depending on the nature of the gas and on the temperature and $a$ and $b$ designating two constants interrelated by the relationship $$\frac{1}{\Delta p} = a\bar{p} + b$$

References Cited by the Examiner

UNITED STATES PATENTS

| 2,480,665 | 8/1949 | Morgan | 73—38 |
| 2,613,531 | 10/1952 | Bacon | 73—38 |
| 2,729,969 | 1/1956 | Innes | 73—38 |
| 2,737,804 | 3/1956 | Hertzog | 73—38 |

ISAAC LISANN, *Primary Examiner.*

B. A. DONAHUE, *Assistant Examiner.*